US009177432B2

(12) United States Patent
Bloss et al.

(10) Patent No.: US 9,177,432 B2
(45) Date of Patent: Nov. 3, 2015

(54) APPARATUS FOR CHECKING BANKNOTES

(75) Inventors: Michael Bloss, München (DE); Wolfgang Deckenbach, Schechen (DE); Georg Vetter, München (DE)

(73) Assignee: GIESECKE & DEVRIENT GMBH, Munich (DE)

(*) Notice: Subject to any disclaimer, the term of this patent is extended or adjusted under 35 U.S.C. 154(b) by 1098 days.

(21) Appl. No.: 11/922,786

(22) PCT Filed: Jun. 22, 2006

(86) PCT No.: PCT/EP2006/006022

§ 371 (c)(1), (2), (4) Date: Dec. 21, 2007

(87) PCT Pub. No.: WO2006/136417

PCT Pub. Date: Dec. 28, 2006

(65) Prior Publication Data

US 2008/0271973 A1 Nov. 6, 2008

(30) Foreign Application Priority Data

Jun. 22, 2005 (DE) ......................... 10 2005 028 906

(51) Int. Cl.
*G07F 7/04* (2006.01)
*G06K 7/00* (2006.01)
(Continued)

(52) U.S. Cl.
CPC .............. *G07D 7/00* (2013.01); *G07D 2207/00* (2013.01)

(58) Field of Classification Search
CPC ..... H03H 9/059; H03H 3/08; H03H 9/02574; H03H 9/1071; H03H 9/02559; H03H 9/02551; H03H 9/02543; H03H 9/14505; H03H 9/14547; H03H 9/1455; H03H 9/1452; H03H 9/6433; H03H 9/14517; H03H 9/02818; H03H 9/02992; H03H 9/0038; H03H 9/643; G01N 29/022; H01L 2924/01079; H01L 2924/14; H01L 2924/01078; H01L 2924/01029; H01L 2924/01013; H01L 31/1113; H01L 29/00; H01L 27/14643; H01L 27/14683; H01L 27/1463; H01L 31/0232; H01L 31/035281; H01L 27/14687; H01L 27/14601; H01L 27/14609; H01L 27/14603; H01L 27/14632; H01L 27/14621; H01L 2224/16; H01L 2924/15311; H01L 2224/48091; H01L 2224/73265; H01L 2924/15153; H01L 21/50; B82Y 10/00; G02B 6/4204; G11C 13/0014; Y02E 10/50; C08L 83/04; C08L 63/00; C09J 183/04; C09J 163/00; C09J 5/00; C08G 77/20; C08G 77/16; C08G 77/12; H05K 3/3321; H05K 3/323; G01J 3/51; G01J 3/513; G01J 3/36; H04N 9/045; G07F 7/04; G07F 19/20; G07D 7/00; G07D 7/12; G07D 7/20; G07D 11/0084; G07D 7/04; G07D 11/0081; B65H 2701/1912
USPC ........... 194/206, 207; 438/118, 119; 257/431, 257/444, 466, 702, 709, 783, 118; 209/534; 382/135; 310/313 R, 313 A, 313 B, 310/313 C, 313 D; 250/226; 156/329, 330
See application file for complete search history.

(56) References Cited

U.S. PATENT DOCUMENTS

| | | | |
|---|---|---|---|
| 3,732,630 | A | 5/1973 | Crosbie et al. |
| 4,793,189 | A | 12/1988 | Dell'Orto et al. |

(Continued)

FOREIGN PATENT DOCUMENTS

| | | | |
|---|---|---|---|
| DE | 38 37 239 | A1 | 5/1989 |
| DE | 41 40 647 | A1 | 6/1993 |

(Continued)

OTHER PUBLICATIONS

M. Baarspul, Delft University of Technology, "The Generation of Motion Cues on a Six-Degrees-of-Freedom Motion System", p. 5, Report LR-248, Jun. 1977.

(Continued)

*Primary Examiner* — Jeffrey Shapiro
(74) *Attorney, Agent, or Firm* — Workman Nydegger

(57) ABSTRACT

An apparatus for checking bank notes in a bank note processing machine includes at least one sensor. The sensor is arranged to determine the information characterizing the bank notes to be checked and is connected to a bending resistant carrier via a first adhesive layer. The bending resistant carrier is further connected to a component of the apparatus for checking bank notes and/or directly with the bank note processing machine via a second, permanently elastic adhesive layer.

5 Claims, 1 Drawing Sheet

(51) Int. Cl.

*G06K 9/00* (2006.01)
*G07D 7/00* (2006.01)

(56) References Cited

U.S. PATENT DOCUMENTS

| | | | | |
|---|---|---|---|---|
| 4,883,264 | A | 11/1989 | Yoshikawa et al. | |
| 5,304,842 | A * | 4/1994 | Farnworth et al. | 257/668 |
| 5,352,762 | A * | 10/1994 | Nagai et al. | 528/322 |
| 5,433,608 | A | 7/1995 | Murray | |
| 5,490,005 | A | 2/1996 | Jueliger | |
| 5,678,678 | A | 10/1997 | Brandt, Jr. et al. | |
| 5,804,004 | A * | 9/1998 | Tuckerman et al. | 156/60 |
| 5,855,993 | A * | 1/1999 | Brady et al. | 428/209 |
| 6,091,837 | A | 7/2000 | Dinh | |
| 6,101,266 | A * | 8/2000 | Laskowski et al. | 382/135 |
| 6,448,624 | B1 | 9/2002 | Ishio et al. | |
| 6,473,165 | B1 * | 10/2002 | Coombs et al. | 356/71 |
| 6,583,834 | B1 * | 6/2003 | Uchiyama | 349/122 |
| 7,002,257 | B2 * | 2/2006 | Tao et al. | 257/787 |
| 7,116,406 | B1 | 10/2006 | Puttkammer | |
| 7,129,709 | B2 | 10/2006 | Puttkammer | |
| 7,133,124 | B2 | 11/2006 | Puttkammer | |
| 7,262,640 | B2 | 8/2007 | Yonezawa et al. | |
| 2003/0074963 | A1 * | 4/2003 | Uramachi | 73/204.22 |
| 2003/0177831 | A1 | 9/2003 | Ikezawa et al. | |
| 2004/0020291 | A1 | 2/2004 | Katsumata et al. | |
| 2004/0227431 | A1 * | 11/2004 | Mishima | 310/313 R |
| 2005/0000619 | A1 * | 1/2005 | Schenkel et al. | 156/73.1 |
| 2005/0217969 | A1 * | 10/2005 | Coombs et al. | 194/206 |
| 2006/0284319 | A1 * | 12/2006 | Jiang | 257/777 |
| 2007/0275505 | A1 * | 11/2007 | Wolterink et al. | 438/118 |
| 2008/0136920 | A1 | 6/2008 | Loeffler | |

FOREIGN PATENT DOCUMENTS

| | | | |
|---|---|---|---|
| DE | 196 20 313 | A1 | 11/1997 |
| DE | 102 40 475 | A1 | 3/2004 |
| DE | 103 34 822 | A1 | 4/2004 |
| DE | 20 2004 011 854 | U1 | 12/2004 |
| JP | 7-27786 | A | 1/1995 |
| RU | 2 177 645 | C2 | 12/2001 |
| RU | 2 190 956 | C2 | 10/2002 |

OTHER PUBLICATIONS

M Baarspul, Delft University of Technology, "The Generation of Motion Cues on a Six-Degrees-of-Freedom Motion System" , p. 6, Report LR-248, Jun. 1977.

J. B. Sinacori, Northrop Corporation, "A Practical Approach to Motion Simulation", p. 13, AIAA paper 73-931. Sep. 1973.

Susan A. Riedel and L.G. Hofmann, Systems Technology Inc., "Investigation of Nonlinear Motion Simulator Washout Schemes", p. 524. p. 530. Proceedings of the 14*th* Annual Conference on Manual Control, Nov. 1978.

Susan A Riedel and L.G. Hofmann, STI, "Manned Engineering Flight Simulator Validation". p. 172. STI-TR-1110-1, AFFDL-TR 78-192 FT-1, Feb. 1979.

David L. Quam. University of Dayton, Ohio, "Human Pilot Perception Experiments". p. 263, Proceedings of the 15*th* Annual Conference on Manual Control, Nov. 1979.

Irving L. Ashkenas, STI, "Collected Flight and Simulation Comparisons and Considerations", pp. 16-26, AGARD CP408 Flight Simulation, Oct. 1985.

* cited by examiner

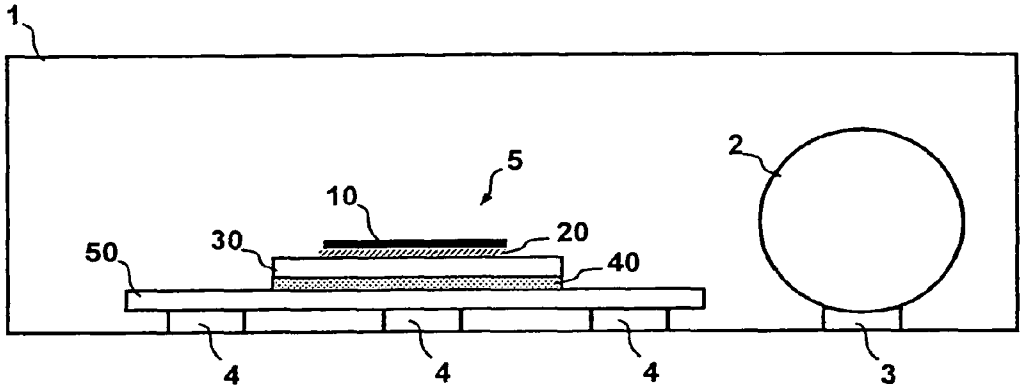
1
2
5
10
20
30
40
50
4
4
4
3

APPARATUS FOR CHECKING BANKNOTES

FIELD OF THE INVENTION

The invention concerns an apparatus for checking bank notes in a bank note processing machine.

BACKGROUND

Bank note processing machines are used for sorting, destroying, dispensing, depositing, etc. bank notes. As a rule the bank notes to be processed are provided in the form of stacks, which are singled in the bank note processing machines. The single bank notes are collected by a transport system and transported through the bank note processing machine for processing. An apparatus for checking bank notes formed by one or several acoustic, electrical, optical, magnetic, mechanical, etc. sensors, can determine information about the bank notes allowing statements on the type, the state, the authenticity etc. of the bank notes. This information from the sensors is evaluated by a control unit. The further processing of the bank notes in the bank note processing machine takes place in dependence on the evaluation of the information.

The mechanical components of the bank note processing machine, for example the drive of the transport system, partly cause strong vibrations, sound, etc., also having an influence on the apparatus for checking bank notes, since these are connected to the bank note processing machine. Thereby the vibrations, the sound, etc. cause an acceleration of the apparatus for checking bank notes or of the sensors contained therein. This in turn has the consequence that the measurements by highly sensitive sensors can be disturbed, therefore worsening the signal-noise ratio of the measuring signals.

SUMMARY

It is therefore an object of the present invention to provide an apparatus for checking bank notes in a bank note processing machine which is less sensitive with regard to occurring disturbances such as vibrations, sound, etc.

In the inventive apparatus for checking bank notes in a bank note processing machine, with at least one sensor for detecting information characterizing the bank notes to be checked, the sensor is connected to a bending resistant carrier via a first adhesive layer, the bending resistant carrier is connected to a component of the apparatus for checking bank notes and/or directly to the bank note processing machine via a second, permanently elastic adhesive layer.

The inventive apparatus for checking bank notes has the advantage that occurring mechanical disturbances, e.g. vibrations, sound, etc. do not, or only to a considerably reduced degree, lead to an impairment of the checking of bank notes.

Further advantages of the present invention can be found in the dependent claims and the following description of an embodiment with reference to a schematic representation. For the sake of simplification in the FIGURE only such components of an apparatus for checking bank notes, as well as of a bank note processing machine containing the same, are shown which are important in connection with the present invention.

BRIEF DESCRIPTION OF THE DRAWINGS

The FIGURE is a schematic representation of a bank note processing machine in accordance with the invention.

DETAILED DESCRIPTION OF EMBODIMENTS

The single FIGURE shows a bank note processing machine 1 containing mechanical components, e.g. a transport system, a singler, etc. The mechanical components are driven by a drive 2, for example by one or several motors. By mechanical connections 3 of the drive 2 and the further mechanical components as well as by accommodation in a housing forming the bank note processing machine 1, the vibrations, sound, etc. generated by the mechanical components and the drive 2 are transferred to all components of the bank note processing machine 1.

Such mechanical disturbances, such as vibrations, sound, etc. are transferred in the housing or via mechanical connections also to an apparatus for checking bank notes. If the mechanical disturbances can act directly on sensors contained in the apparatus for checking bank notes, the sensors are accelerated, deformed, e.g. inflected, etc. by the mechanical disturbances. It is known about sensors of semiconductor materials, e.g. III-IV semiconductors such as GaAs, InGaAs, etc., that noise signals are produced thereby, which have an influence on the measurements, since the noise signals worsen the signal-noise ratio. Such disturbances are also known as microphony effect.

In order to prevent such negative influences of the mechanical disturbances on apparatus for checking bank notes or to reduce them considerably, it is provided in an apparatus 5 for checking bank notes to connect a sensor 10 consisting of a semiconductor material with a bending resistant carrier 30. The bending resistant carrier 30 can be produced of a ceramic material or of similar materials with a high modulus of elasticity. The bending resistance of the carrier is substantially influenced also by the ratio of length or width to thickness, wherein a ratio of approximately 10 has proven advantageous. A connection 20 can e.g. be established by gluing together the sensor 10 and the bending resistant carrier 30. A first adhesive 20 used for this purpose is to be a high-strength, single- or multi-component structural adhesive, which is preferably adapted to be conductive. For example an epoxy resin adhesive can be used as adhesive 20. To produce a bending resistant, high-strength adhesive connection, the gap between the glued-together components is to be kept as narrow as possible, preferably smaller than 100 μm, and the dimensions of the carrier 30 are to be adjusted to be slightly oversized in relation to the dimensions of the sensor 10 and the contact zones required for the electrical connection.

The composite of the sensor 10, the first adhesive layer 20 and the bending resistant carrier 30 is finally mechanically and electrically connected to a conductor plate, a housing or similar 50 forming the apparatus 5 for checking bank notes. Since the conductor plate, the housing or similar 50 is directly connected to the bank note processing apparatus 1 via mechanical connections 4, the mounting of the composite of the sensor 10, the first adhesive layer 20 and the bending resistant carrier 30 on the conductor plate, the housing or similar 50 is effected by a permanently elastic connection. For this purpose a second adhesive layer 40 is used, formed by means of a permanently elastic adhesive, e.g. single- or multi-component silicone, or a permanently elastic double-faced adhesive tape. The thickness of the permanently elastic adhesive connection 40 is to be chosen in such a manner that the disturbance-inducing, mechanical vibrations of the conductor plate, the housing or similar 50 are dampened optimally, without impairing the position stability of the sensor 10.

Through the use of the second, permanently elastic adhesive layer 40 the transfer of mechanical disturbances, such as e.g. vibrations, to the sensor 10 is prevented. The bending resistant carrier 30 prevents deformations of the sensor 10, such as e.g. inflections. Thereby the problems of checking banknotes in bank note processing machines described above are prevented or largely reduced.

The composite of the sensor 10, the first adhesive layer 20 and the bending resistant carrier 30 can also be directly connected to the bank note processing machine or its housing 1 by means of the second, flexible adhesive layer 40.

It was described above that the apparatus for checking bank notes is contained in a bank note processing machine containing a drive, a transport system, etc., which generate disturbances in the form of vibrations, shocks, etc. However, it is obvious that the apparatus for checking bank notes can also be used in bank note processing machines of a different construction type. For example this can be a hand-held checking device, which contains the apparatus for checking bank notes and is guided by hand across bank notes to be checked, wherein disturbances such as vibrations, shocks, etc. also occur.

The invention claimed is:

1. Apparatus for checking bank notes in a bank note processing machine, comprising at least one sensor for detecting information characterizing the bank notes to be checked, wherein the sensor is connected to a bending resistant carrier via a first adhesive layer, and the bending resistant carrier is connected to a component of the apparatus for checking bank notes and/or directly to the bank note processing machine, via a second, permanently elastic adhesive layer;

wherein the first adhesive layer is formed by a high-strength structural adhesive;

wherein the second adhesive layer is formed by a permanently elastic elastomeric reaction adhesive or a permanently elastic elastomeric adhesive tape with a multilayer structure;

wherein the thickness of the first adhesive layer is less than 100 μm.

2. Apparatus according to claim 1, wherein the bending resistant carrier is formed by a material with a high modulus of elasticity.

3. Apparatus according to claim 1, wherein the component of the apparatus for checking bank notes is a conductor plate or a housing.

4. Apparatus according to claim 1, wherein the at least one sensor comprises a semiconductor material.

5. Apparatus for checking bank notes in a bank note processing machine, comprising at least one sensor for detecting information characterizing the bank notes to be checked, wherein the sensor is connected to a bending resistant carrier via a first adhesive layer, and the bending resistant carrier is connected to a component of the apparatus for checking bank notes and/or directly to the bank note processing machine, via a second, permanently elastic adhesive layer;

wherein the first adhesive layer is formed by a high-strength structural adhesive;

wherein the second adhesive layer is formed by a permanently elastic elastomeric reaction adhesive or a permanently elastic elastomeric adhesive tape with a multilayer structure;

wherein the bending resistant carrier has a ratio of length or width to thickness of approximately ten.

* * * * *